United States Patent
Mertins et al.

(10) Patent No.: US 10,941,963 B2
(45) Date of Patent: Mar. 9, 2021

(54) ABSORBER SYSTEM

(71) Applicant: FRENELL GmbH, Karlsruhe (DE)

(72) Inventors: Max Mertins, Freiburg (DE); Nicolaus Lemmertz, Karlsruhe (DE); Moritz Naumann, Karlsruhe (DE)

(73) Assignee: FRENELL GmbH, Karlsruhe (DE)

( * ) Notice: Subject to any disclaimer, the term of this patent is extended or adjusted under 35 U.S.C. 154(b) by 551 days.

(21) Appl. No.: 15/128,504

(22) PCT Filed: Mar. 24, 2015

(86) PCT No.: PCT/DE2015/100124
§ 371 (c)(1),
(2) Date: Sep. 23, 2016

(87) PCT Pub. No.: WO2015/144138
PCT Pub. Date: Oct. 1, 2015

(65) Prior Publication Data
US 2017/0097173 A1    Apr. 6, 2017

(30) Foreign Application Priority Data

Mar. 24, 2014 (DE) .................. 10 2014 104 030.9
Mar. 25, 2014 (DE) .................. 10 2014 104 100.3

(51) Int. Cl.
*F24S 20/25* (2018.01)
*F24S 20/20* (2018.01)
(Continued)

(52) U.S. Cl.
CPC ............... *F24S 20/25* (2018.05); *F24S 20/20* (2018.05); *F24S 23/70* (2018.05); *F24S 25/00* (2018.05);
(Continued)

(58) Field of Classification Search
CPC ................................. F24S 20/25; F24J 2/0015
(Continued)

(56) References Cited

U.S. PATENT DOCUMENTS

| 4,135,493 A | 1/1979 | Kennedy |
| 4,159,712 A * | 7/1979 | Legg ............... F24S 20/40 126/584 |

(Continued)

FOREIGN PATENT DOCUMENTS

| CL | 200600795 | 4/2005 |
| CL | 200401960 | 11/2010 |

(Continued)

OTHER PUBLICATIONS

International Search Report of PCT/DE2015/100124, dated Jul. 1, 2016.
Chilean Search report in CL 201602392 dated Jul. 22, 2019.

*Primary Examiner* — Steven B McAllister
*Assistant Examiner* — Allen R Schult
(74) *Attorney, Agent, or Firm* — Collard & Roe, P.C.

(57) ABSTRACT

An absorber system solves problems of known absorber systems for use in solar fields in that the absorber tube is suspended on a rail below an absorber cover. The design also makes it possible to move measuring and cleaning robots and the like along the absorber tube more and allows the absorber tube and the secondary reflector to be jointly suspended, whereby an exact mutual alignment between the two components is enabled.

2 Claims, 7 Drawing Sheets

(51) Int. Cl.
*F24S 23/70* (2018.01)
*F24S 25/00* (2018.01)
*F24S 30/20* (2018.01)
*F24S 40/80* (2018.01)
*F24S 25/60* (2018.01)
*F24S 23/79* (2018.01)

(52) U.S. Cl.
CPC .............. *F24S 30/20* (2018.05); *F24S 40/80* (2018.05); *F24S 23/79* (2018.05); *F24S 2025/6003* (2018.05); *Y02E 10/40* (2013.01); *Y02E 10/47* (2013.01)

(58) Field of Classification Search
USPC ......................................................... 126/704
See application file for complete search history.

(56) References Cited

U.S. PATENT DOCUMENTS

| | | | | |
|---|---|---|---|---|
| 4,333,447 | A * | 6/1982 | Lemrow | F24S 40/80 126/657 |
| 4,423,719 | A | 1/1984 | Hutchison | |
| 4,515,148 | A * | 5/1985 | Boy-Marcotte | F24S 25/00 126/570 |
| 4,770,162 | A * | 9/1988 | L'Esperance | F24S 23/745 126/570 |
| 5,024,211 | A | 6/1991 | Winzen | |
| 8,746,236 | B2 | 6/2014 | Powell | |
| 9,033,528 | B2 | 5/2015 | Stoeger et al. | |
| 9,270,225 | B2 * | 2/2016 | Clavelle | H02S 20/30 |
| 2006/0197305 | A1 * | 9/2006 | Wichern | B60B 9/06 280/283 |
| 2007/0227531 | A1 | 10/2007 | Garcia Cors et al. | |
| 2008/0087277 | A1 | 4/2008 | Schweyher | |
| 2011/0180059 | A1 | 7/2011 | Selig et al. | |
| 2012/0160234 | A1 * | 6/2012 | Wares | G02B 19/0042 126/684 |
| 2014/0360490 | A1 | 12/2014 | Sauerborn et al. | |

FOREIGN PATENT DOCUMENTS

| | | |
|---|---|---|
| CL | 201202928 B1 | 6/2013 |
| DE | 266 805 C | 10/1913 |
| DE | 28 01 560 A1 | 7/1978 |
| DE | 27 26 531 A1 | 12/1978 |
| DE | 39 00 203 A1 | 7/1990 |
| DE | 100 36 746 A1 | 1/2002 |
| DE | 10 2010 014787 A1 | 10/2011 |
| DE | 10 2011 088 829 B3 | 4/2013 |
| EP | 2 256 428 A1 | 12/2010 |
| WO | 99/42765 A1 | 8/1999 |
| WO | 02/12799 A2 | 2/2002 |
| WO | 2010/025808 A2 | 3/2010 |
| WO | 2010/142666 A2 | 12/2010 |
| WO | 2012/145774 A2 | 11/2012 |
| WO | 2013/061139 A1 | 5/2013 |

* cited by examiner

ABSORBER SYSTEM

CROSS REFERENCE TO RELATED APPLICATIONS

This application is the National Stage of PCT/DE2015/100124 filed on Mar. 24, 2015, which claims priority under 35 U.S.C. § 119 of German Application Nos. 10 2014 104 030.9 filed on Mar. 24, 2014 and 10 2014 104 100.3 filed on Mar. 25, 2014, the disclosures of which are incorporated by reference. The international application under PCT article 21(2) was not published in English.

BACKGROUND OF THE INVENTION

1. Field of the Invention

The present invention relates to an absorber system comprising an absorber mounting, an absorber support apparatus, and an absorber cover, as well as an absorber tube that is suspended on a support carriage on a rail element supported by the absorber support apparatus.

2. Description of the Related Art

Such an absorber system is already known from the German patent DE 10 2011 088 829 B3. There, it is proposed that an absorber tube is suspended on a rail using a carriage arrangement. This involves, in a concrete embodiment, a double-T rail, into which roller elements engage on both sides, which elements carry a carriage that can move along the rail. The absorber tube is suspended on this carriage and is positioned elevated above the primary reflectors distributed all around it, in such a manner that these deflect the incident light onto the absorber tube and heat it within the scope of line focusing.

In concrete terms, the solution proposed provides, first of all, for a support structure that is formed, in simplified terms, from a perpendicular support and a transverse strut that completes it at the top. Holding frames that are formed to be essentially rectangular are mounted on this T-shaped arrangement, which can certainly also be formed in Y shape, for example, in a concrete embodiment. Spring tabs are formed in one piece with these holding frames, which tabs connect the elements braced between the individual load-bearing supports with the load-bearing supports. On the basis of these spring tabs, which form solid-body articulations with regard to the load-bearing supports, equalization can take place if length changes occur due to temperature differences, so that movements of the material that accompany the length changes do not lead to damage.

Thus, first of all, the aforementioned rail element should be mentioned as an element between the individual load-bearing supports, on which element the absorber tube is suspended using the support carriage that is longitudinally displaceable on the rail element. This makes it possible to mount the absorber tube, which is subject to extreme temperature variations, so as to be movable on the rail element, to a great extent, in order to avoid compression or excess stretching. Independent of this, DE 10 2011 008 829 B3 provides for an absorber cover, in which a secondary reflector is suspended, so that the latter, in turn, can be moved, at least in restricted manner, not only relative to the absorber tube but also relative to the load-bearing support, by way of the solid-body articulations. In this regard, the absorber cover as such is formed in box shape and is, in turn, firmly connected with the load-bearing supports. It consists of multiple individual parts, which each form sections of the housing and are set up, in up to three parts, around the absorber tube and the secondary reflector.

However, from different aspects, the previously known solution appears to be complicated and therefore expensive, and to bring some disadvantages with it. For example, it can be stated, first of all, that the absorber cover, as a welded construction, is complicated to produce, since the hood parts, which are bent at right angles, must be connected with the load-bearing supports independently of one another. Furthermore, the individual hood parts must be assembled in such a manner that a movement of the support carriage of the absorber tube through the hood parts is possible at the same time, since the rail suspension is disposed above the housing formed by the absorber cover. This in turn exposes the support carriage of the absorber tube to weather influences, so that increasing wear must be expected. Mounting of the secondary reflector also requires separate measures in the region of the absorber cover and the holding frame of the load-bearing supports. The clip that accommodates the absorber tube overlaps the tube directly, so that heat transfer from the absorber tube to the clip takes place and thereby the clip in turn is greatly heated. This clearly increases the material demands on the clip that holds the absorber tube, for one thing, as well as on the support carriage directly connected with this clip. For another thing, it leads to greater heat emission, since the emitting surface is clearly increased in size as a result. This greater emission must be considered to be efficiency-reducing, as heat loss. Finally, it appears complicated to undertake measurement of the present known structure using measuring instruments, because a separate rail arrangement would have to be used for this purpose, in order to implement continuous measurement of the solar radiation entering into the absorber tube.

SUMMARY OF THE INVENTION

Proceeding from this set of problems and the problems known in connection with the state of the art, the invention has set itself the task of proposing an absorber system that eliminates the numerous problems of the state of the art, and makes both production and operation of an absorber and the further installations required for this purpose simpler and more efficient.

This task is accomplished by different aspects of the invention, particularly an absorber mounting according to the characteristics of one aspect of the invention, an absorber mounting according to the characteristics of another aspect of the invention, an absorber cover according to the characteristics of a further aspect of the invention, an absorber support apparatus according to the characteristics of an additional aspect of the invention, an absorber system according to the characteristics of another aspect of the invention, as well as a method for construction of an absorber cover according to the characteristics of a further aspect of the invention. Practical embodiments of the method and of the apparatus parts and of the system as a whole can be derived from the discussion below.

According to the invention, an absorber system essentially consists of three components, an absorber support apparatus, an absorber cover mounted on the latter, as well as an absorber mounting on which the absorber tube is mounted in suspended manner. In this regard, the absorber mounting also comprises, according to the invention, a support carriage that can be moved on a rail element. However, the invention, in contrast to the state of the art, provides, in this regard, that a clip for overlapping the absorber tube is assigned to the support carriage, which clip holds the absorber tube in place, with the interposition of a plurality of support elements distributed over the inside circumference of the clip, which elements are thermally insulating and, if applicable, also electrically insulating. In other words, more or less point-shaped contacting of the absorber tube, which is very hot during operation, is carried out, and furthermore proceeds using thermally insulating support elements. Because of the circumstance that insulation of the absorber tube takes place directly upon its first contacting, the heat loss on the basis of heat emission, heat conduction, and convection due to heating of unnecessary other components is minimized. Heat loss is restricted exclusively to the absorber tube itself, to the greatest possible extent.

Because of the circumstance that the support elements do not or hardly pass on the heat of the absorber tube, the clip and therefore also the rest of the support carriage remain insignificantly above ambient temperature, so that furthermore, the material stress on these elements can be kept as low as possible.

In fact, the use of such support elements brings with it the problem that these must be produced from a material that brings suitable thermal and, if applicable, electrical insulation with it. A ceramic material is particularly suited for this, which material in turn brings with it the problem that it is sensitive to impact. If, therefore, the support elements are produced from ceramic, according to the invention, then the support elements can be permanently damaged by impacts on the absorber tube, which can occur due to thermal length changes of the tube. For this reason, it is particularly provided that measures for cushioning such impacts relative to the support elements are provided. One possibility for cushioning consists in that the support elements are accommodated by means of accommodations for attachment to the clip, wherein these accommodations are disposed on a spring crosspiece, in each instance. The spring crosspieces can be worked out of the solid material of the clip, in that a material slot that faces in the circumference direction is introduced underneath the accommodation, into which slot the material of the spring crosspiece can move in the event of an impact. Thus, although the support element itself will not be able to cushion impacts elastically, its accommodation on the clip will be able to do so, as the end effect.

An alternative to this consists in that a ductile inlay is disposed between absorber tube and support element or, alternatively, also between support element and clip, in other words an intermediate layer that consists of resilient material. Such a ductile inlay can be produced from copper or aluminum, for example. Because of the required size, essentially corresponding to the contact surface of the support element with the absorber tube or with the accommodation on the clip, such a ductile inlay causes practically no additional emission losses.

In an advantageous embodiment, the support elements can be profiled in the longitudinal direction of the absorber tube, so that in particular, they have at least one groove that runs in the radial direction of the absorber tube. In this way, support crosspieces are formed on both sides of the groove, wherein the free ends of these support crosspieces enter into direct contact with the absorber tube. In particular, the groove can be prepared in such a manner so as to accommodate a weld seam of the absorber tube within itself, thereby causing additional fixation between clip and absorber tube to occur.

The clip in turn, as has already been mentioned, is suspended on a support carriage, which has one or more rollers. These rollers are prepared for accommodation on a rail element, along which the support carriage can be moved using the rollers. The rollers in turn are attached to spring crosspieces of the support carriage, which carriage essentially consists of a support body, into which, in turn, material slots are introduced above and/or below the attachment of the individual rollers. Thus, it is possible here, as well, that in the event of an impact of the absorber tube or an impact on the rail element, this impact can be cushioned by means of a movement of the spring crosspiece in the direction of the material slot. If the spring crosspiece is disposed centered in the support body of the support carriage, it is practical to provide a material slot on both sides of the suspension of the roller element.

First of all, the clip that carries the absorber tube is therefore suspended on a support carriage, and will hang downward due to gravity, in this respect. For further more precise alignment, extension arms can be assigned to the clip on both sides, which arms allow support on an absorber cover that overlaps the absorber tube. For this purpose, roller elements can be assigned to the extension arms, which elements make it possible for them to be supported on the inside of an absorber cover, rolling on it, so that here, too, mobility of the carriage is maintained. Because of this three-point support on the rail element as well as at two points of the absorber cover, the absorber tube gets into a precisely defined position, and mobility still exists only in the longitudinal direction of the absorber tube, which mobility must be guaranteed because of the temperature expansion of the tube. This allows very precise guidance of the solar radiation directly onto the absorber tube, by means of alignment of the primary mirrors.

It is known that a secondary reflector is assigned to the absorber tube in the immediate vicinity, in order to throw solar radiation reflected by the primary mirrors, which misses the absorber tube, back onto the absorber tube from the other side, and thereby to increase efficiency. Here, too, it is necessary to create very precise alignment between the secondary reflector and the absorber tube. Because of the significantly lesser distances between the secondary reflector and the absorber tube, here it is actually significantly more important to implement precise alignment. Therefore, it appears practical, in contrast to the state of the art, to suspend the secondary reflector specifically not independent of the absorber tube, but rather to implement the suspension jointly with the absorber tube. For this reason, spring elements can be additionally assigned to the extension arms, by way of which elements the secondary reflector is assigned to the extension arms. The reflector, as a hood construction, overlaps the absorber tube as well as the clip that encompasses it, and in this regard is laid onto the extension arms of the clip. Because of the resilient attachment, impacts relative to the secondary reflector are also cushioned, so that here, too, damage can be prevented to the greatest possible extent. Because of the joint, longitudinally movable suspension of absorber tube and secondary reflector, these two elements maintain their reciprocal position precisely, and this leads to more precise alignment of the incident energy radiation onto the absorber tube.

Supplemental to the secondary reflector, the latter can in turn be surrounded by a protective hood, once again, which hood is therefore disposed between the secondary reflector and an outer absorber cover. Such a protective hood can particularly be produced from sheet steel, above all from stainless sheet steel, so that the protective hood in turn can also bring about a certain reflection. In the event of damage to the glass reflector, this protective hood composed of sheet steel protects the material of the absorber cover from being greatly heated by the incident radiation from the primary mirrors, and from being damaged as a result, if applicable.

A connection between the protective hood and the secondary reflector can be produced by means of gluing, for example.

According to the invention, an absorber system furthermore has an absorber cover that protects the absorber tube and the secondary reflector that surrounds it from damage and contamination, toward the outside. In contrast to the state of the art, however, it is provided in this regard, according to the invention, that the absorber cover covers not only the absorber tube and the secondary reflector, but also the complete suspension, so that penetration of contaminants, for example due to weather influences, is prevented to a great extent. This is of great importance, particularly for the optical surfaces of the absorber tube and of the secondary mirror, in order to minimize cleaning cycles. The material stress with regard to weather influences that are eliminated as a result also increases the durability and the efficiency of the arrangement. For this purpose, the rail element can be a C-rail that is open toward the bottom, for example, because here, too, penetration of external influences is made more difficult once again. In this case, the support carriage is provided essentially as a construction having a planar support body, which has rollers on both sides, which are then threaded into the C-rail. However, many other rail shapes, such as, for example, a double-T rail, can also be used.

The absorber cover consists of an absorber hood that is held in shape using portal-shaped holding frames distributed over its longitudinal expanse. The holding frames overlap the absorber hood in such a manner that the absorber hood is practically suspended from the inner contour of the holding frames. In particular, it is provided that the holding frames have a round or polygonal inner contour, so that conversely, the outer contour of the absorber hood is also configured to be arch-shaped or polygonal. In particular, it speaks in favor of a polygonal configuration that this brings with it great rigidity and allows precise production.

In a further development of the absorber cover, it is provided that a holding bracket is assigned to the holding frames in the region of the inner contour, which bracket preferably projects, in the region of the apex of the inner contour, into the region spanned by the holding frames. In this regard, the holding bracket is open toward the bottom and is suitable for accommodating the rail, a C-rail or double-T-rail in the example. This means that the holding bracket replicates the outer contour of the rail at least essentially, so that the rail can be pushed through the holding bracket, but merely possesses degrees of freedom in its longitudinal direction there. In this way, dropping out downward is prevented in spite of the configuration of the holding bracket, which is open downward. In this regard, the opening width of the holding bracket corresponds essentially to the opening width of the rail, so that the support carriage can be moved in the rail and can move past the holding bracket without hindrance, because of the opening in it.

The absorber hood, which is produced as a one-piece element and can be brought into the desired outer contour by means of bending, for example, has accommodations in the region of its apex, which allows the holding brackets to be passed through the material of the absorber hood. This brings the absorber cover into precise contact with the holding frames, for one thing; on the other hand, this replicates the inner contour enclosed by the holding brackets on the inside of the absorber hood. After the absorber hood has been put together with the holding frames in this manner, subsequently the rail can be pushed through the holding brackets that project into the interior of the absorber hood, below the absorber hood, so that in this way, a first fixation between absorber hood and holding frames is created, using the rail. To complete the absorber cover, the rail can be pressed against the holding bracket using clamping elements, for one thing, in that a clamping element is used that spreads out between absorber hood and rail, using a clamping screw, for example. At the free ends of the holding frames, the latter can be connected with the absorber hood by means of face-side screw connections, for example.

This overall construction composed of absorber cover and an absorber mounting that lies within it, as well as an absorber tube suspended thereby is now disposed on an absorber support apparatus that is forked on its side facing the absorber cover, and keeps a travel path clear between two fork struts, in each instance, for a travel carriage that can be moved below the absorber cover, in the longitudinal expanse direction. Because the absorber cover does not require a transverse strut between a fork of the load-bearing support or the free ends of the holding frames, respectively, because of the construction, sufficient space is established in which a travel carriage can move below the absorber tube, in the longitudinal direction of the latter. This space can be aligned, without interruptions, relative to the absorber tube, since an interruption, for example by means of transverse struts of the load-bearing supports, as is shown in the state of the art, does not take place. In this regard, travel surfaces can be assigned to the fork struts or also to the absorber cover, on both sides, on which surfaces a travel carriage can be guided in the longitudinal expanse direction of the absorber tube. For example, such travel surfaces can be situated in the immediate vicinity of the lower edge of the absorber cover, so that a travel carriage can be set onto both travel surfaces, and it is also made impossible for such a travel carriage to become derailed, due to the lateral delimitations.

At some advantage, the individual load-bearing supports are formed, in this construction, from multiple Y-shaped layers, which, although they are jointly disposed on the load-bearing support, are held so as to be movable relative to one another. In this regard, mobility is once again implemented by means of a solid-body articulation, in that the fork struts of the Y-arrangement are configured to be resilient, in each instance. This once again allows absorption of different temperature expansions of the materials that are carried by the load-bearing supports, and prevents compression and expansion in the material.

BRIEF DESCRIPTION OF THE DRAWINGS

The invention described above will be explained in greater detail below, using an exemplary embodiment.

The figures show.

DETAILED DESCRIPTION OF THE PREFERRED EMBODIMENTS

Figure 1:
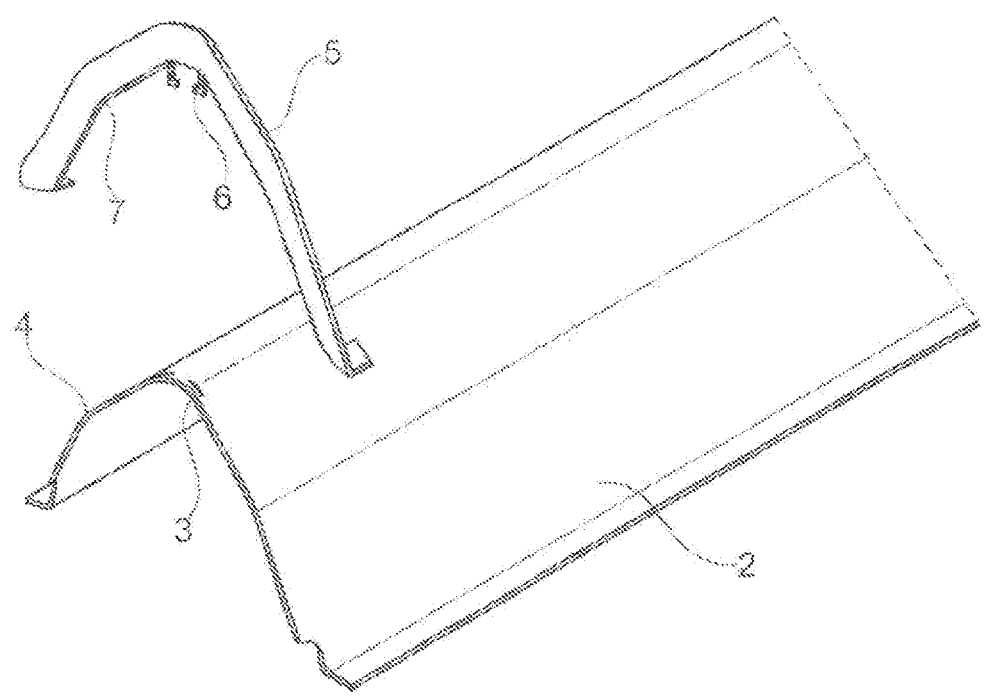
FIG. 1 an absorber cover in a perspective, exploded representation, at a slant from above, FIG. 2 an absorber cover in a face-side frontal representation in the viewing direction of the longitudinal expanse of the absorber cover, FIG. 3 a detail of the apex of the absorber cover according to FIG. 2, in a face-side top view, FIG. 4 a detail of the free edges of the absorber cover according to FIG. 2, in a face-side top view, FIG. 5 the absorber cover according to FIG. 2 in connection with a load-bearing support, in a face-side top view, FIG. 6 a support carriage in a lateral top view, FIG. 7 the absorber cover according to FIG. 2 with the support carriage laid in, and a clip with extension arms attached to it, in a face-side top view, FIG. 8 the absorber cover according to FIG. 2 without a support carriage, only with the secondary reflector laid in, and the protective hood, in a face-side top view, as well as FIG. 9 a complete absorber system, comprising an absorber cover, an absorber mounting, an absorber tube, as well as a load-bearing support and a travel carriage, in a face-side top view.

FIG. 1 shows an absorber hood 2, which has been produced from sheet steel by bending, in one piece. The absorber hood 2 has a polygonal outer contour 4, as well as two recesses 3 in an apex region. In the region of its longitudinal edges, the absorber hood 2 furthermore has a bend. In the sense of an exploded representation, a holding frame 5 is shown above the absorber hood 2, which frame possesses a polygonal inner contour 7. In this regard, the polygonal inner contour 7 is shaped in such a manner that it corresponds with the polygonal outer contour 4 of the absorber hood 2. Furthermore, the holding frame 5 has a holding bracket 6 in its apex region, which bracket is open toward the bottom and encloses a recess. The polygonal outer contour 4 of the absorber hood 2 can be brought into contact with the polygonal inner contour 7 of the holding frame 5 by means of lowering the holding frame 5 in such a manner that the parts of the holding bracket 6 pass through the recesses 3. As a result, the holding bracket 6 and the shape section enclosed by it project into the absorber hood 2, so that subsequently, a counter-engagement means can be pushed through this shape section. Because of this, separation of absorber hood 2 and holding frame 5 is subsequently made impossible, so that this measure firmly connects absorber hood 2 and holding frame 5 with one another. Supplementally, the holding frame 5 has screw surfaces at its free ends, by way of which a screw connection with the absorber hood 2 can be brought about in the region of the bend of the hood along its longitudinal edges. By means of this assembly step, which, in the simplest case, merely comprises pushing in a counter-engagement means, for example a C-rail for accommodation of a support carriage, an absorber cover 1 according to the invention is produced.

Figure 2:
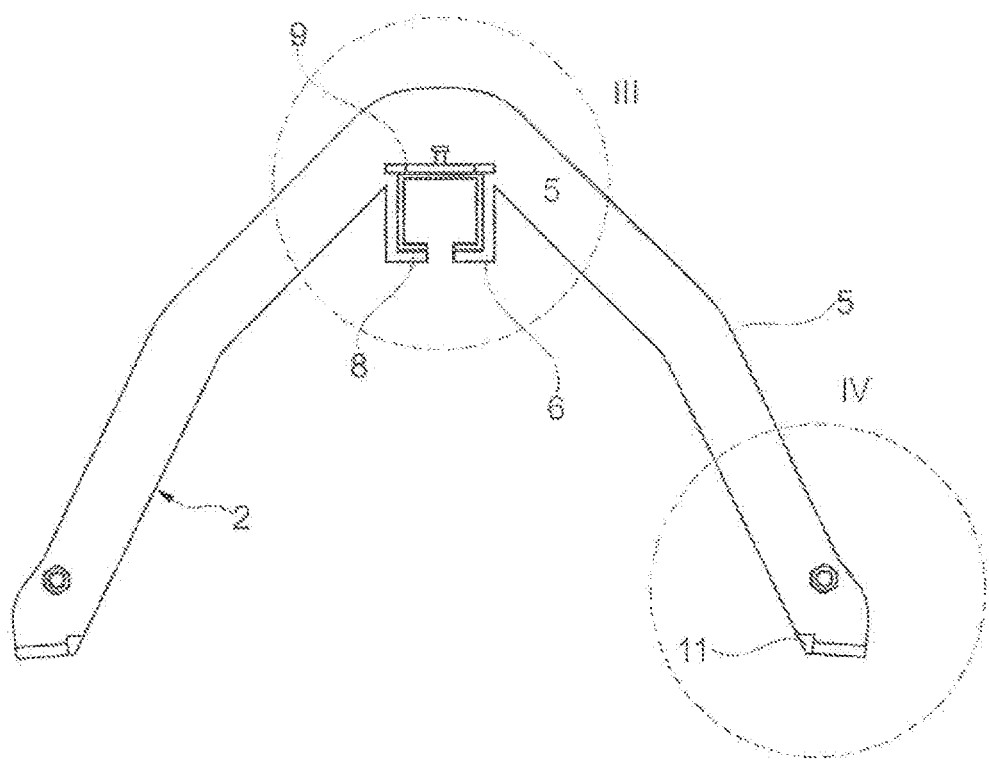

FIG. 2 shows the absorber cover 1 in a face-side top view, now with further added elements. The polygonal inner contour 7 of the holding frame 5 is clearly evident; the absorber hood 2 now lies directly against it. After the absorber hood 2 is caused to make contact, a C-rail 8 is pushed into the holding bracket 6, as shown in the figure, and subsequently clamped in place with a clamping apparatus 9. A travel surface 11 was disposed at the free ends of the holding frame 5 or of the bend of the absorber hood 2, at their longitudinal edges.

Figure 3:
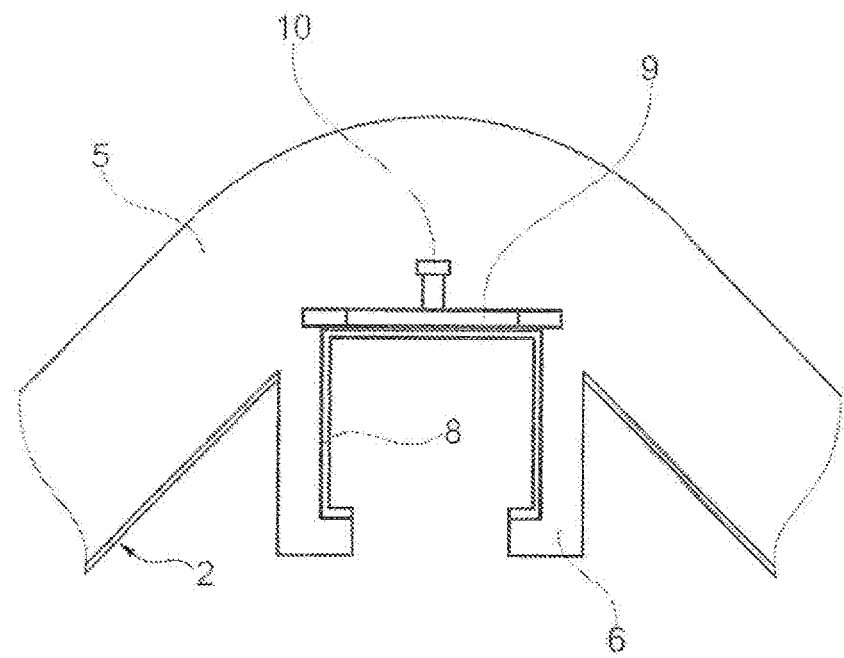

FIG. 3, as a detail, shows the attachment of the C-rail 8 at the apex of the holding frame 5. In this regard, the C-rail 8 has an essentially rectangular cross-section, wherein narrowing occurs in the region of the opening of the C-rail 8. This narrowing ensures precise positioning of the C-rail 8 in the correspondingly shaped holding bracket 6, for one thing; for another, the bracket ensures centering of a support carriage 28 that is guided in the C-rail 8 and will be shown later. After the absorber hood 2 and the holding frame 5 have been joined together, the C-rail 8 can at first be easily pushed into the holding bracket 6 in the longitudinal direction of the absorber hood 2. Subsequently, a clamping apparatus 9 disposed above the C-rail 8 is clamped in place by means of screwing a clamping screw in relative to the C-rail 8. This takes place in that the fixed clamping apparatus 9 is pressed away from the C-rail 8 by means of penetration of the clamping screw 10, which leads to the result, as a reaction, that the C-rail 8 is pressed into the contour of the holding bracket 6, because of the impossibility of evasion of the clamping apparatus 9. In this way, a very simple but effective connection between absorber hood 2, holding frame 5, and C-rail 8 comes about.

Figure 4:
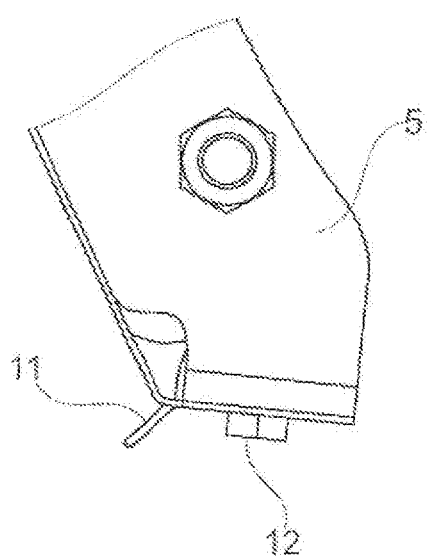

FIG. 4 shows the free end of the holding frame 5, around which a bend in the region of the longitudinal edge of the absorber hood 2 is passed. An additional profile element is set onto this bend by means of screwing it on; this element implements a travel surface 11 on the inside of the absorber hood 2.

Figure 5:
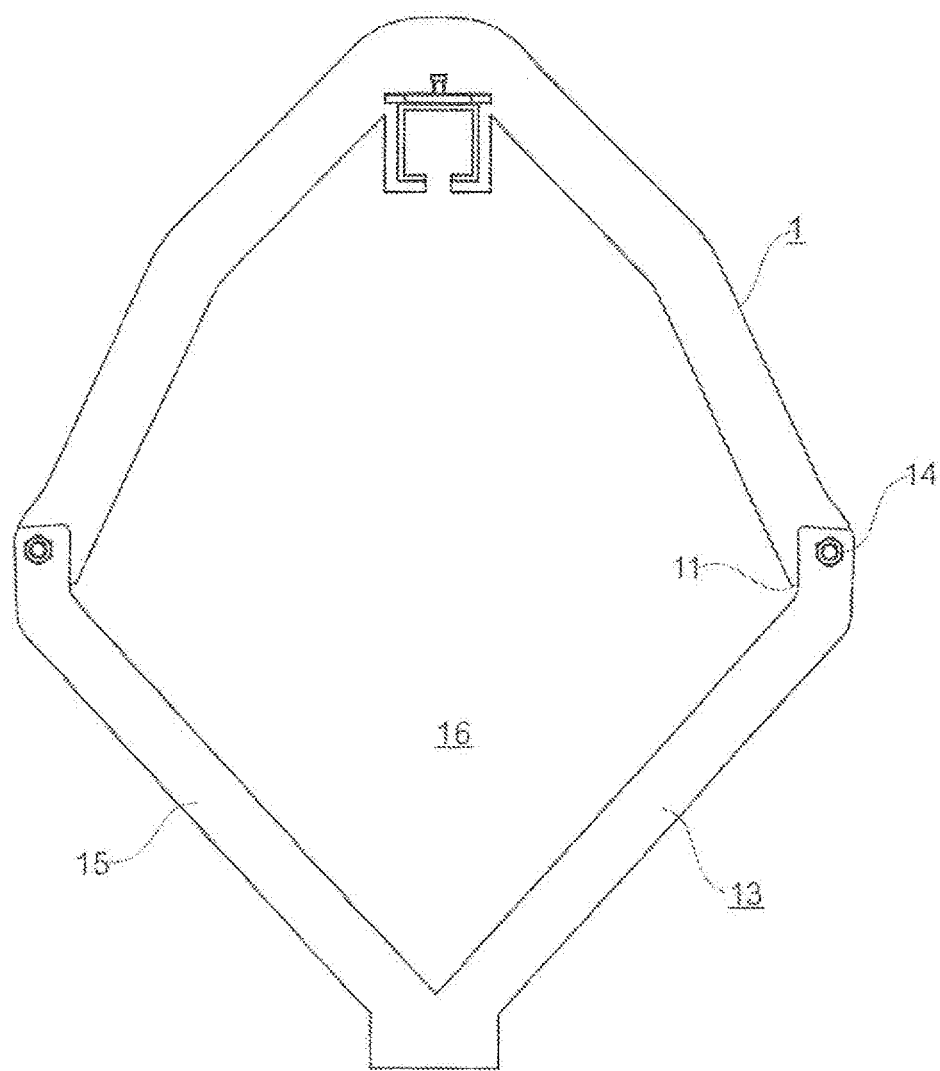

FIG. 5 shows a combination of the absorber cover 1 shown in FIG. 2, which is connected with a load-bearing support 13. In this regard, a connection once again takes place by means of a screw connection 14 in the region of the respective free ends of holding frame 5 and load-bearing support 13, so that a further space is encompassed between the holding frame 5 and the load-bearing support 13. A travel path 16 for a travel carriage is kept clear in the lower region of this space; the carriage can be set onto the travel surfaces 11 and hangs through into the travel path 16. Because of the lateral delimitations of the travel surfaces 11 by the absorber hood 2 or the absorber cover 1, lateral slipping of a travel carriage 35 positioned in the travel path 16 is prevented, as will be shown later. The lateral fork struts 15 are configured as a solid-body articulation in the case of the load-bearing supports 13, in other words produced from a thin spring steel, so that they can give way in the longitudinal direction of the absorber tube.

Figure 6:
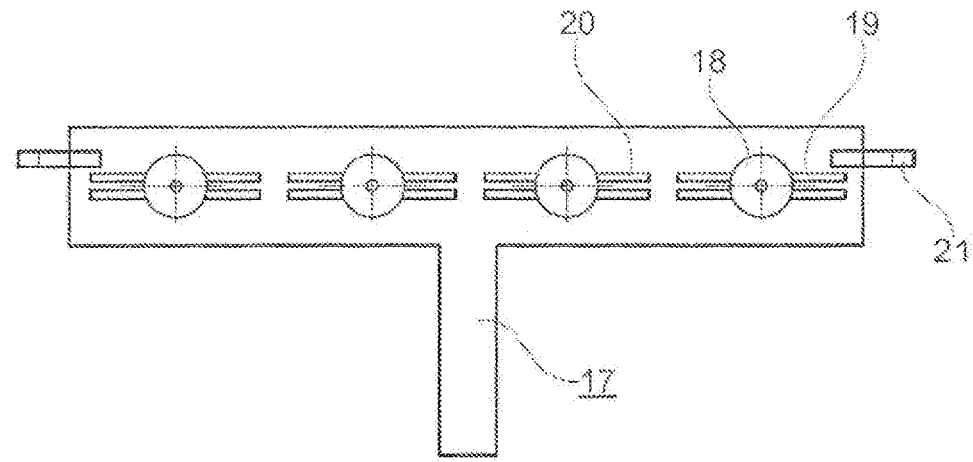

FIG. 6 shows the support body 17 of a support carriage 28, which is supposed to be moved in the C-rail 8 of the absorber cover 1. For introduction into the C-rail 8, the support body 17 has an arrow-shaped, end-position threading aid 21 at both ends, in each instance, which aid facilitates pushing the support carriage into the C-rail 8. Rollers 18, which are disposed on both sides, at the front and at the back of the support body 17, are directly accommodated in the C-rail. These rollers are attached to a spring crosspiece 19, in each instance, which, in the example shown, is disposed centered in the support body 17. As a result, it is necessary to separate these spring crosspieces 19 from the support body 17 on both sides, using material slots 20, so that in the event of a vertically directed impact, the spring crosspieces 19, together with the rollers 18, can move into the material slots 20. As a result, it is made possible to already absorb some impact force in the spring element formed in this manner.

Figure 7:
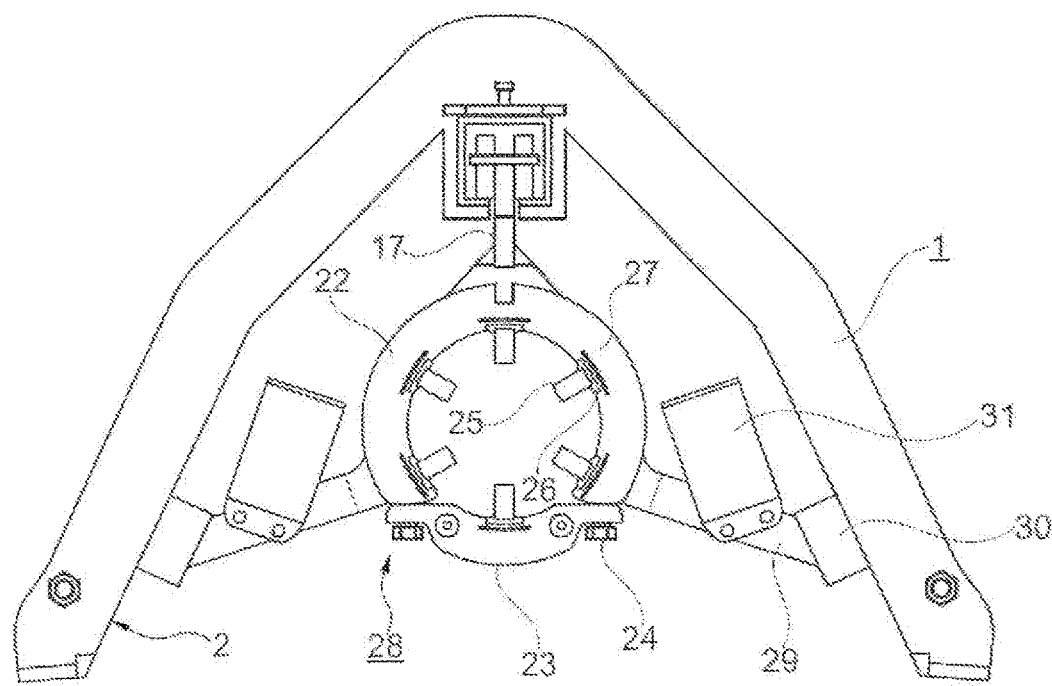

FIG. 7 shows the combination of a cover 1 as already described in FIG. 2 and a support carriage 28 supplemented with a clip 22. The support body 17 is threaded into the C-rail 8 with its rollers 18 and carries the clip 22, which is formed in circular shape with a clip gate 23. The clip 22 can be laid around an absorber tube 37, which will be shown later, by opening the screw connections 24, and will then contact the tube all around with support elements 25. This results in fixation of the absorber tube 37 using the support elements 25, so that an encompassing three-point suspension is created. In this regard, the support elements 25 are produced from ceramic, so that it is necessary to dispose the support elements 25 on a spring crosspiece 26, in each instance, which crosspiece in turn is spaced apart from the actual clip 22 by a material slot 27. Because of the fact that the material slot 27 is only delimited spatially, however, the spring crosspiece 26 is still connected with the clip 22. Extension arms 29 are disposed laterally on the clip 22, on both sides, which arms offer lateral support relative to the absorber hood 2, using the end-position roller elements 30. As a result, lateral back-and-forth movement of the arrangement is prevented. Furthermore, spring elements 31 are disposed on the extension arms 29; a secondary reflector 33 and a related protective hood 34 can be set onto these elements.

Figure 8:
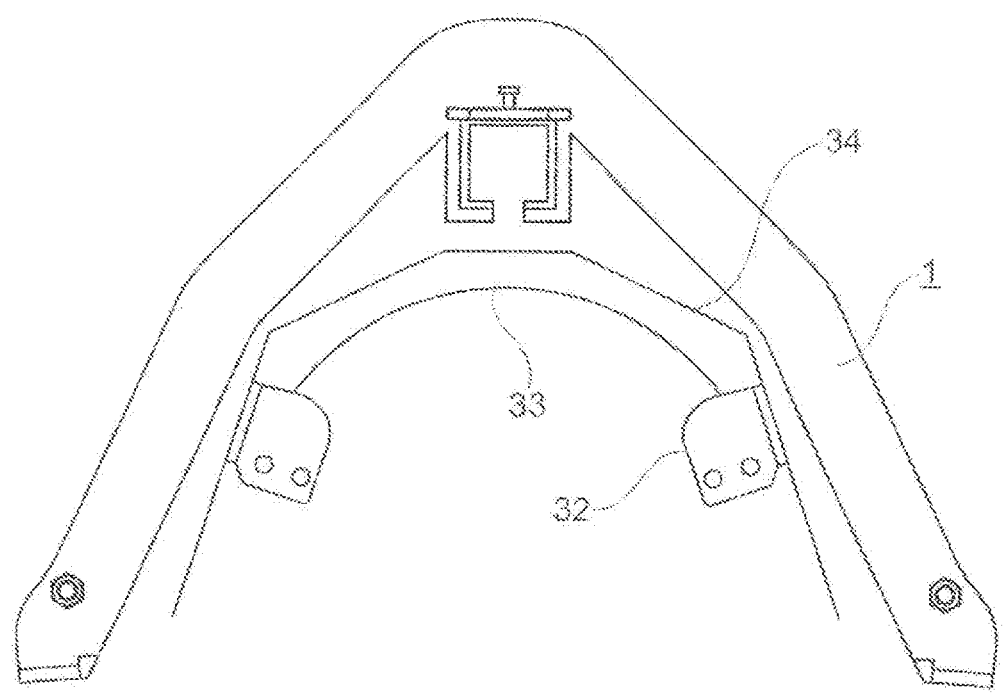

FIG. 8 shows these additional elements, which are not shown in FIG. 7 for the sake of clarity. The combination of secondary reflector 33 and protective hood 34 can be set onto the spring elements 31 using a spring support 32, so that simultaneous displacement or expansion of absorber tube 37 and secondary reflector 33 is made possible. This allows very precise reciprocal alignment, so that great efficiency can be achieved in passing on the energy from the secondary reflector 33 to the absorber tube 37. In the event of damage to the secondary reflector 33, the arrangement of the secondary reflector 33 around the protective hood 34, which is connected with the reflector by means of gluing, for example, protects the absorber cover 1 from damage caused by the concentrated incident sunlight.

Figure 9:
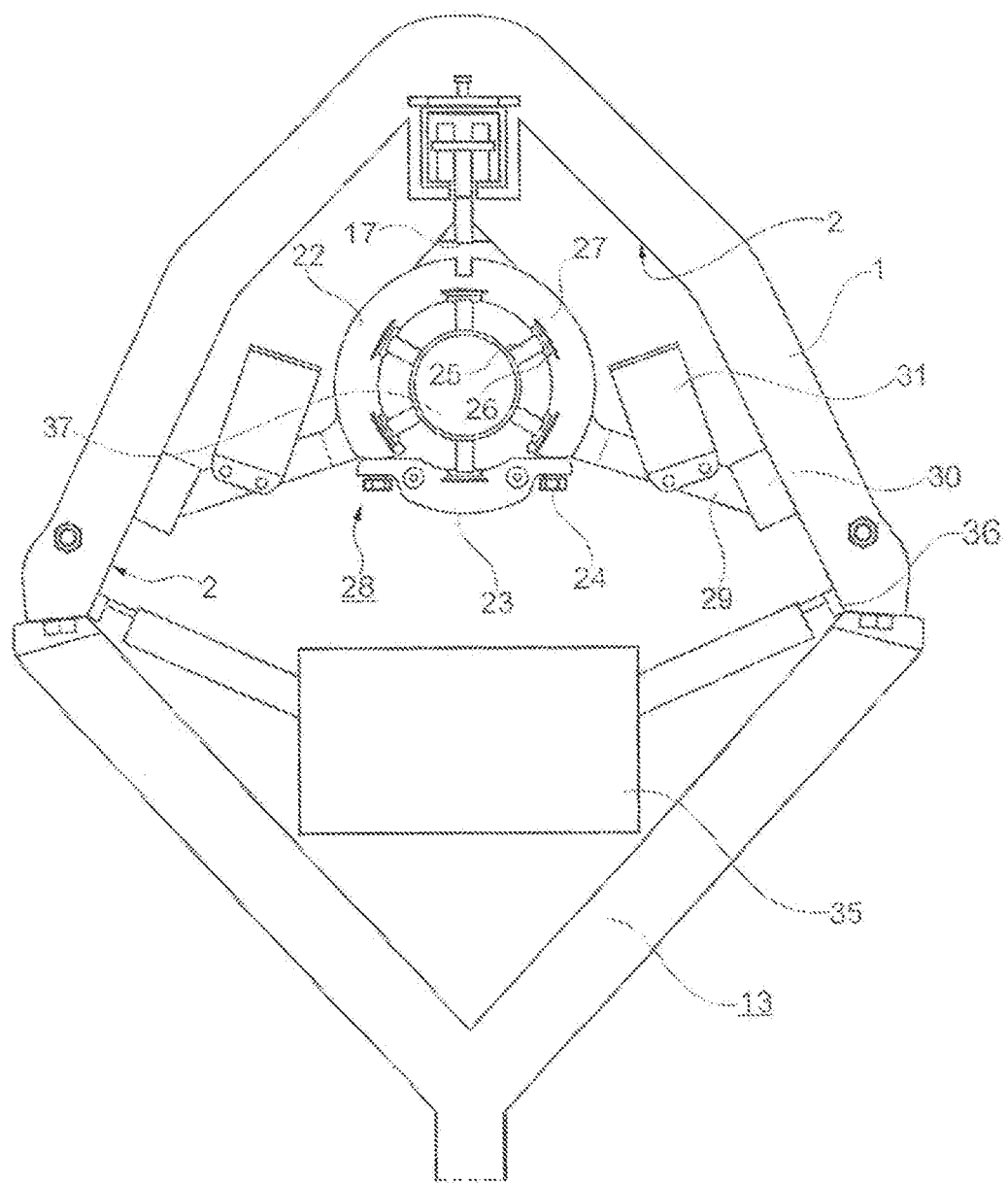

FIG. 9 shows a complete absorber system, comprising a load-bearing support 13, onto which an absorber cover 1 is laid. The absorber cover 1 comprises an absorber hood 2, which is laid over an absorber tube 37 and protects the latter from weather influences. A support carriage 28 that holds the absorber tube 37 in position is also accommodated under the absorber hood 2. Because of this construction, a travel path for a travel carriage 35 is kept clear below the absorber tube 37, between lateral fork struts 15 of the load-bearing support 13; the carriage can be set onto a travel surface 11 in the edge region of the absorber cover 1, using roller elements 36. Such a travel carriage 35, for example with a measuring robot for measuring the radiation of the individual primary mirrors that impacts the absorber tube 37, is thereby able to carry out measurements along the entire absorber tube 37, without having to be removed in between or without being interrupted by transverse struts.

Thereby, an absorber system comprising an absorber cover, an absorber support structure, as well as an absorber mounting has been described above, wherein the mounting mounts an absorber tube in longitudinally movable manner. Because of a novel construction of the absorber cover, the latter allows weather-protected mounting of the support carriage on which the absorber tube is suspended, for one thing, in other words a simple and cost-advantageous construction. Because of its thermal and electrical insulation solution, the absorber mounting offers more efficient suspension of the absorber tube, for another thing, and reduces energy losses due to heat emission. The construction of the absorber support structure furthermore allows an intelligent arrangement of travel carriages that can be moved in the region of the absorber tube.

REFERENCE SYMBOL LIST 1 absorber cover
2 absorber hood
3 recess
4 polygonal outer contour
5 holding frame
6 holding bracket
7 polygonal inner contour
8 C-rail
9 clamping apparatus
10 clamping screw
11 travel surface
12 screw connection
13 load-bearing support
14 screw connection
15 forked strut
16 travel path
17 support body
18 roller
19 spring crosspiece
20 material slot
21 threading aid
22 clip
23 clip gate
24 screw connection
25 toothed element
26 spring crosspiece
27 material slot
28 support carriage
29 extension arm
30 roller element
31 spring element
32 spring support
33 secondary reflector
34 protective hood
35 travel carriage
36 roller element
37 absorber tube

The invention claimed is:

1. An absorber cover comprising:
a rail having a width and a length longer than the width, wherein the rail is open downward;
an absorber tube mounted on the rail, in suspended manner;
a support carriage; and
an absorber hood disposed over the rail, the support carriage, and the absorber tube;
wherein the absorber hood has a longitudinal expanse and is held using holding frames distributed over the longitudinal expanse;
wherein the holding frames encompass the absorber hood in a transverse direction relative to the longitudinal expanse, and each holding frame has a holding bracket for accommodation of the rail in a region of an inner contour of each of the holding frames;
wherein the holding bracket is open downward in a first position;
wherein the holding bracket of a first holding frame of the holding frames is disposed at an apex of the inner contour of the first holding frame;
wherein the absorber hood has recesses for accommodation of the holding bracket in a region of the apex;
wherein the recesses are spaced apart from one another; and
wherein the absorber hood has an outer contour and the outer contour fits into the inner contour of the first holding frame.

2. The absorber cover according to claim 1, wherein the inner contour of the holding frames is round or polygonal.

* * * * *